No. 618,532. Patented Jan. 31, 1899.
R. D. BEMAN.
SELF MEASURING APPARATUS FOR DISPENSING LIQUIDS.
(Application filed Aug. 1, 1898.)
(No Model.) 4 Sheets—Sheet 1.

Witnesses:
D. W. Edelin.
E. M. Young.

Inventor
R. D. Beman
By his attorneys
Connie & Goldsborough

No. 618,532. Patented Jan. 31, 1899.
R. D. BEMAN.
SELF MEASURING APPARATUS FOR DISPENSING LIQUIDS.
(Application filed Aug. 1, 1898.)
(No Model.) 4 Sheets—Sheet 2.

Witnesses:
D. W. Edelin.
E. M. Young.

Inventor.
R. D. Beman
By his attorneys
Pennie & Goldsborough

No. 618,532. Patented Jan. 31, 1899.
R. D. BEMAN.
SELF MEASURING APPARATUS FOR DISPENSING LIQUIDS.
(Application filed Aug. 1, 1898.)
(No Model.) 4 Sheets—Sheet 3.

Witnesses:
D. W. Edelin.
E. M. Young.

Inventor:
R. D. Beman
By his attorneys
Pennie & Goldsborough

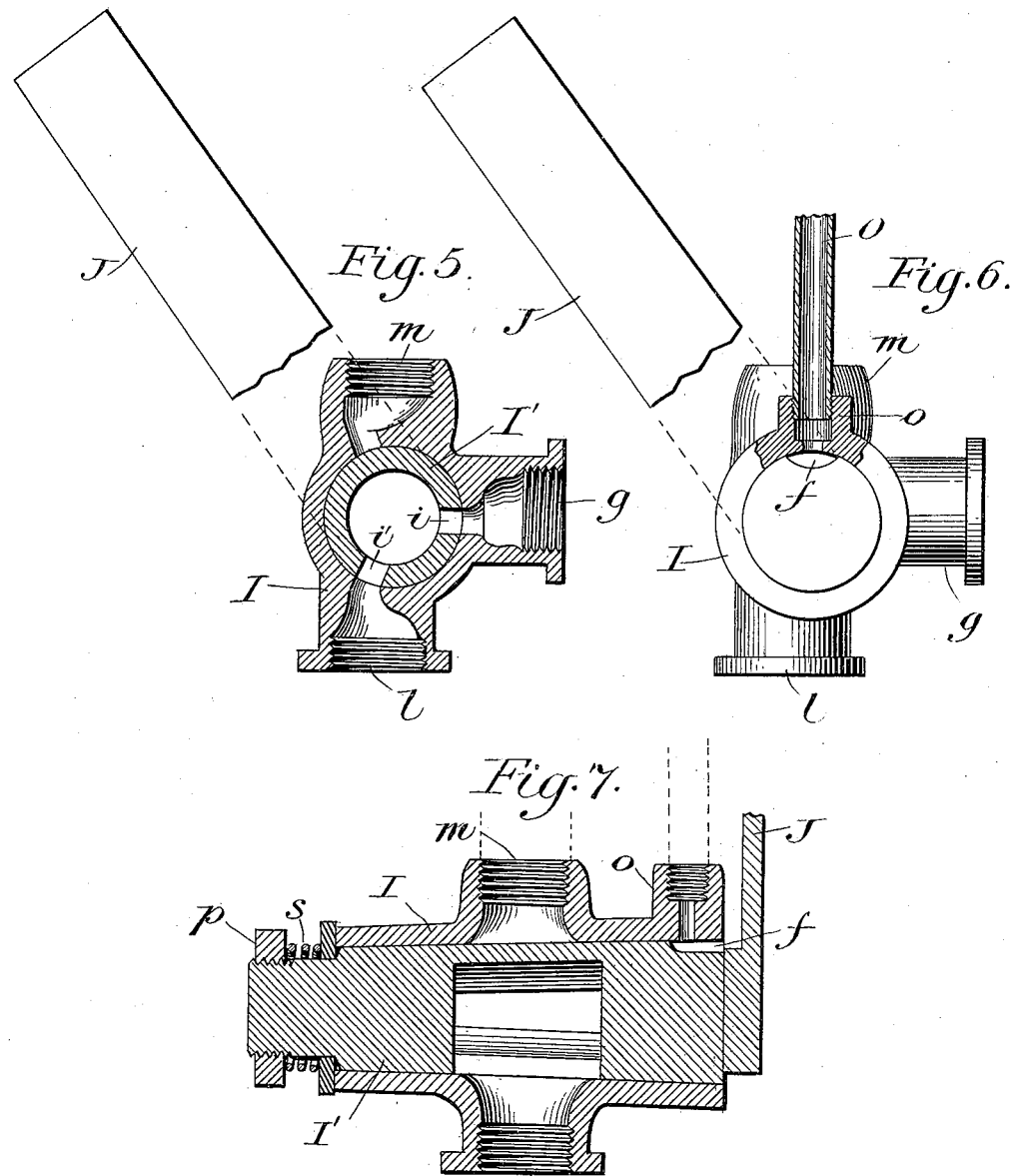

UNITED STATES PATENT OFFICE.

ROY DOUGLAS BEMAN, OF MEADVILLE, PENNSYLVANIA.

SELF-MEASURING APPARATUS FOR DISPENSING LIQUIDS.

SPECIFICATION forming part of Letters Patent No. 618,532, dated January 31, 1899.

Application filed August 1, 1898. Serial No. 687,421. (No model.)

*To all whom it may concern:*

Be it known that I, ROY DOUGLAS BEMAN, a citizen of the United States, residing in Meadville, in the county of Crawford, State of Pennsylvania, have invented certain new and useful Improvements in Self-Measuring Apparatus for Dispensing Liquids; and I do hereby declare the following to be a full, clear, and exact description of the invention, such as will enable others skilled in the art to which it appertains to make and use the same.

The invention has for its object to provide an improved construction of automatic or self measuring receptacle or apparatus for dispensing coal-oil or other liquids; and the improvement consists in the construction and arrangement illustrated in the accompanying drawings and described and claimed in the following specification and claims.

Figure 1:
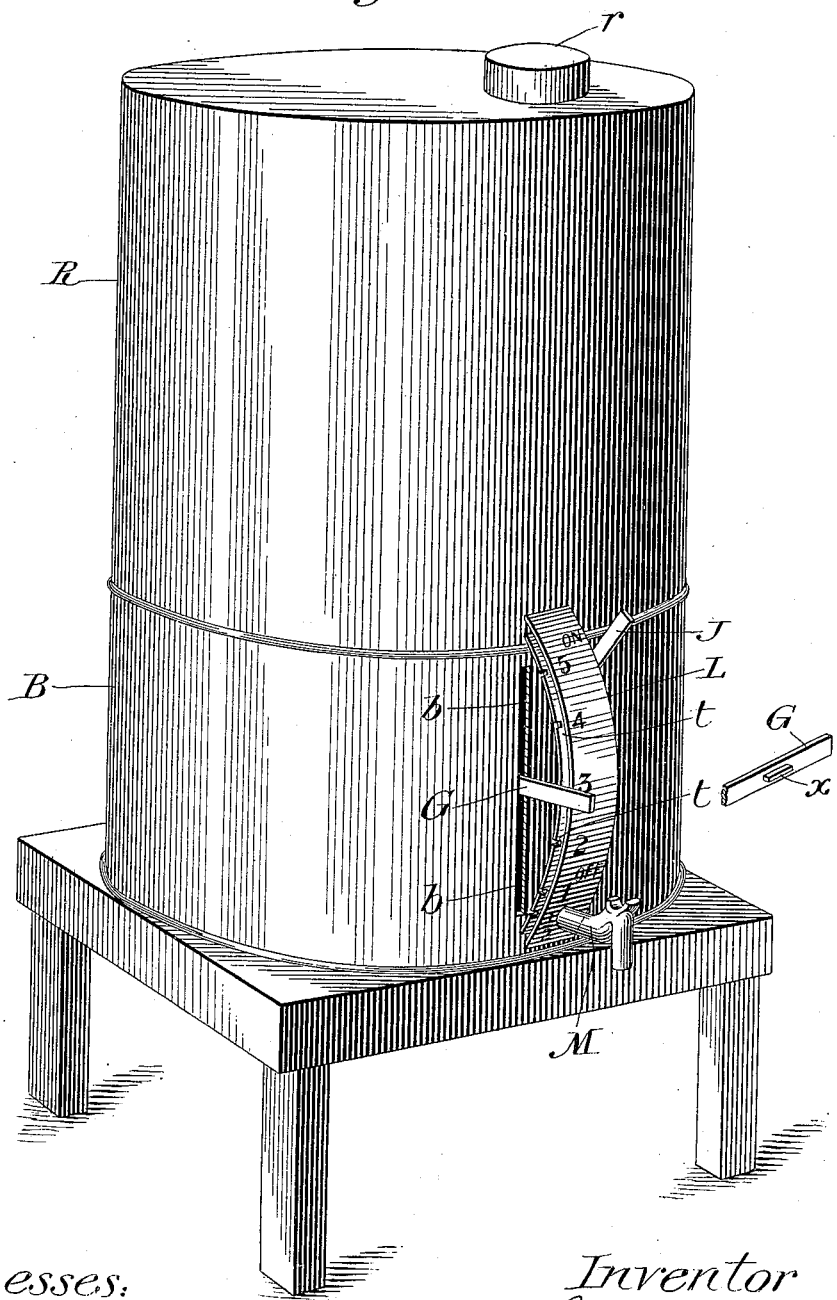
Figure 2:
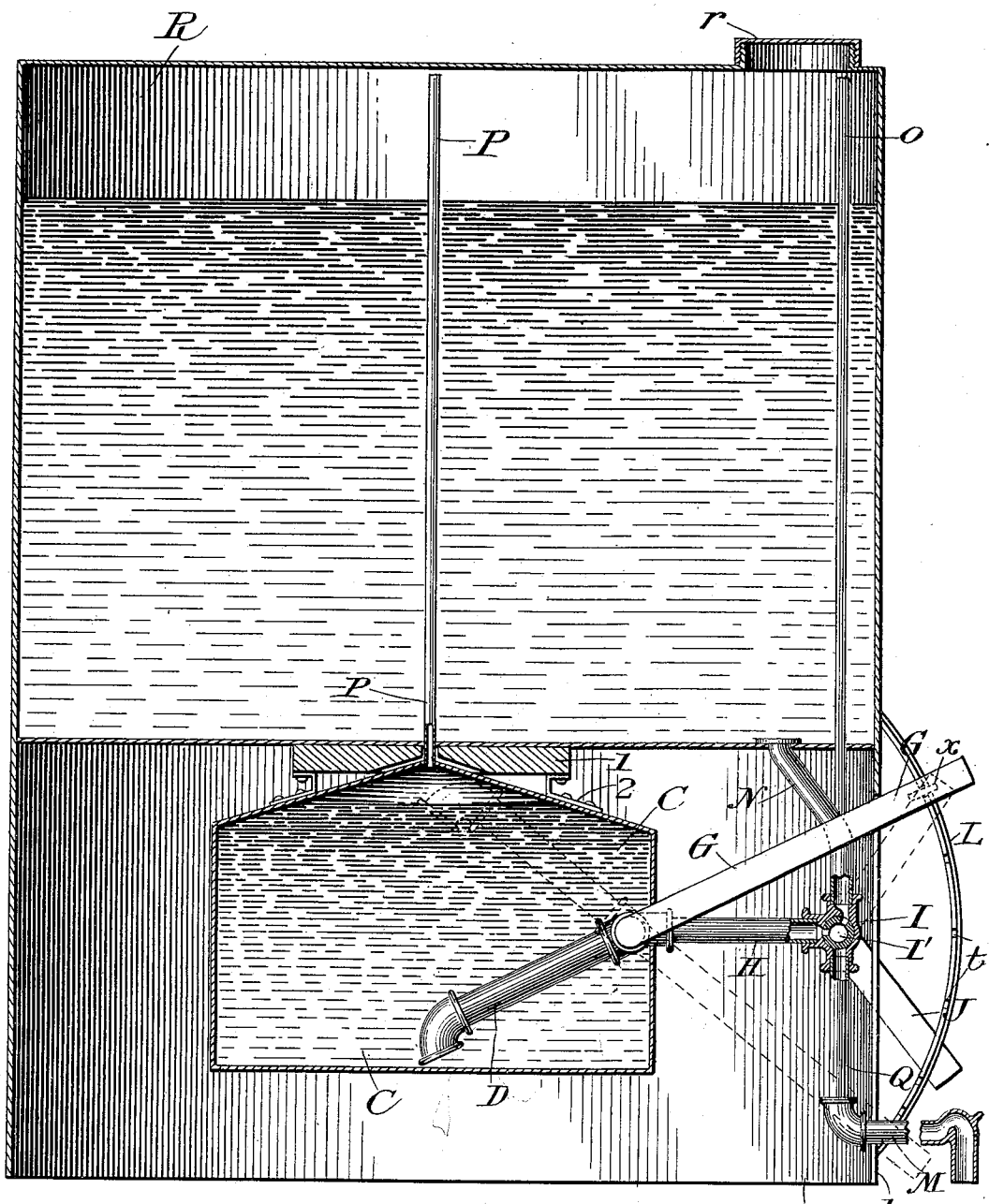
Figure 3:
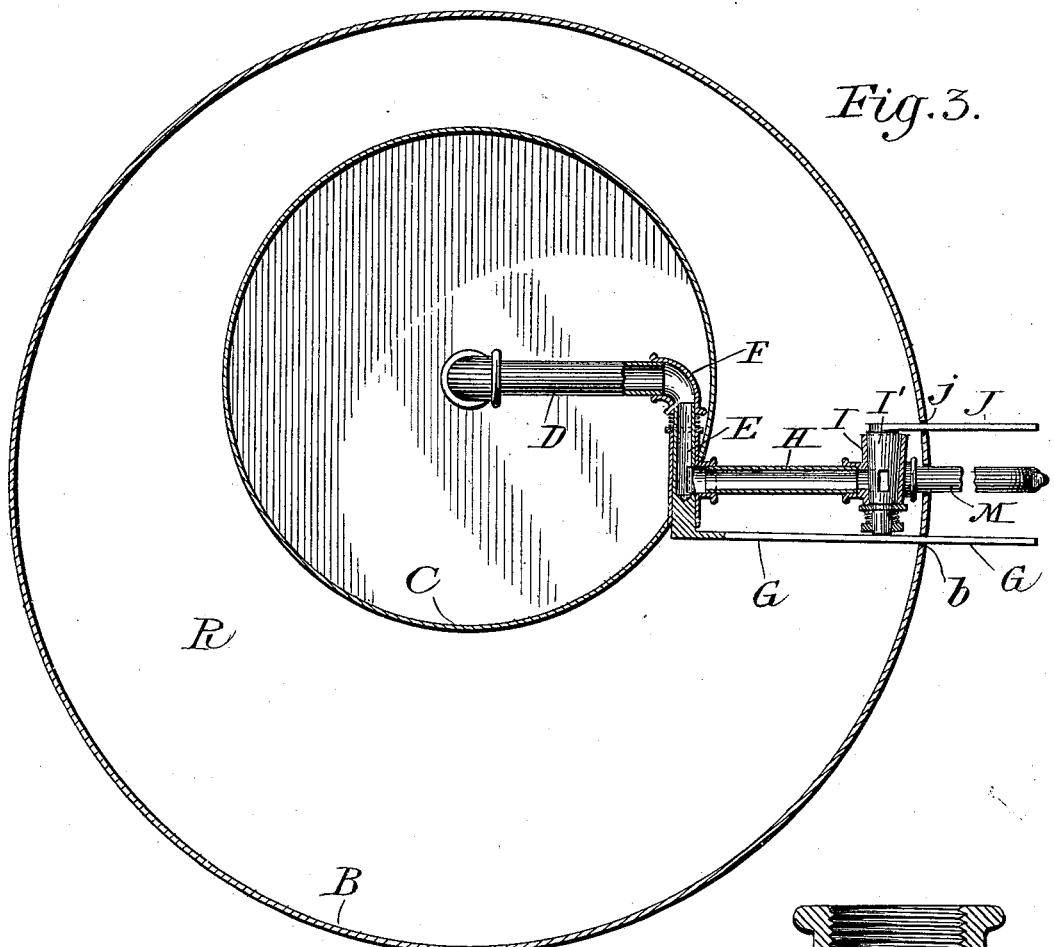
Figure 4:
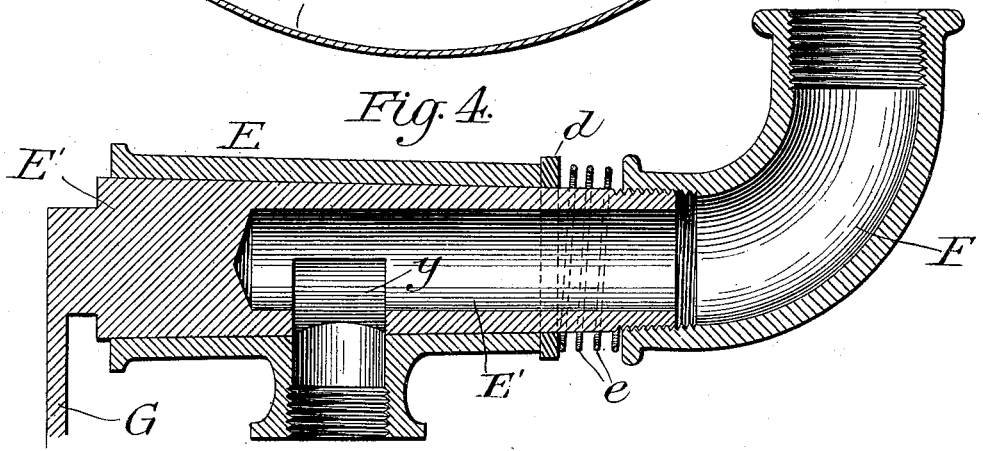

In the drawings, Figure 1 is a perspective of my improved receptacle; Fig. 2, a vertical central section of the same, illustrating the interior construction and the working parts; Fig. 3, a horizontal section taken through the valves; Fig. 4, an enlarged section of the joint-valve carrying the pivoted siphon; and Figs. 5, 6, and 7, detail views in elevation and section of the two-way valve controlling the flow of liquid from the storage-tank to the measuring vessel and the discharge of the same from the latter.

In the drawings, R denotes a portable tank or reservoir, which is elevated above the surface on which it rests by a support B. Underneath the tank R is located the measuring vessel C, which is considerably smaller than the tank and preferably secured to and suspended from its bottom by means of a block 1 and brackets 2. In order to give the device a neat and attractive appearance and to conceal and protect the measuring vessel, the support B is formed by an annular edge rim depending from the bottom of the tank.

The storage-reservoir is adapted to hold a large quantity of liquid; but, although the size of the measuring-receptacle is of no particular consequence, it is preferably made only large enough to hold a few gallons at a time—for example, the maximum amount which it is thought a single customer would be likely to call for. The liquid is delivered from the supply-tank to the measuring vessel by means of pipes N H, the former opening from the bottom of the tank and the latter into the vessel C at the side. The flow of liquid into the vessel C is controlled by a valve I', working in a casing I, with which both pipes N and H communicate, and the valve I' is preferably made a two-way valve for the purpose of also controlling the discharge of the liquid from the measuring vessel, which, by means hereinafter described, is effected through the pipe H, the casing I of the valve, and a pipe Q, communicating with the casing and having the discharge-spout M at its lower end. The construction of this valve and its casing are clearly illustrated in Figs. 5, 6, and 7 of the drawings, where the latter is shown as having connections $m$, $g$, and $l$ for the pipes N, H, and Q, respectively, and the valve as being hollow in the center and having liquid-passages $i$ and $i'$, arranged, preferably, one hundred and twenty degrees apart and adapted to connect simultaneously either with the pipes N and H or H and Q, so as to permit the flow of liquid into or from the vessel C, the other pipe or pipes being meantime closed. The valve I' is shown as a rotary plug-valve, and in order to make a tight joint with its casing and prevent leakage it is made tapering and at its smaller end is provided with a threaded projecting end upon which is adjustably screwed a nut $p$, between which and the end of the casing I a spring $s$ is coiled around the end.

The storage-tank is made air-tight for the purpose of preventing the evaporation of the liquid and the emission of odors therefrom, and a cap $r$ for filling is provided at the top, as shown in Figs. 1 and 2. The air-tight construction of the tank requires some provision for the admission of air during the discharge of liquid from the measuring vessel, and I arrange this by providing the valve-casing I with a connection $o$ for a pipe O, which connects the interior of the casing with the top of the tank, and I form a cut or notch $f$ in the plug of the valve in circumferential line with the connection $o$, and so locate it relatively to the openings $i$ and $i'$ that the pipe O is open to the atmosphere only when the measuring vessel is in communication with the spout through the pipes H and Q, it being closed tightly when the valve is in such position that the measuring vessel is filling through the pipes N and H. In order to permit the air contained in the vessel C to pass out as the liquid runs in from the tank, I provide an equalizing valveless pipe P, which leads from the top of the vessel C (preferably made conical or dome-shaped) to the top of the tank R.

The mechanism thus far described only provides for filling the measuring vessel from the supply-tank and discharging the liquid therefrom; but my invention also provides for drawing off from the receptacle C any amount of liquid less than the entire contents, and the essential feature of the means by which this is accomplished is an adjustable siphon, which, although not broadly new with me, I believe to be novel in so far as its arrangement and manner of operating are concerned. This siphon is denoted by D in the drawings. (See Figs. 2 and 3.) It is hinged or pivoted at one side and on the inside of the measuring vessel C, the end of the pipe H being extended through the wall of the vessel and provided with a tubular coupling E, which forms the support for and pivotal joint on which the siphon turns. This joint is denoted by E' (see Figs. 3 and 4) and is similar in general construction to the valve I'. It is hollow from one end to a point opposite the entrance of the pipe H into the casing E, where it is provided with a liquid-passage $y$, which leaves the end of the pipe H open in all positions of the siphon. The siphon-pipe D is secured at one end to the open end of this rotary coupling, and its opposite end (where the liquid enters) is located centrally within the vessel C, so that the tipping of the vessel will not affect its ability to correctly measure and draw off the contents. In order to make a tight joint between the coupling E' and prevent leakage, the plug is made tapering in the same way as the valve I', and a spring $e$, that is coiled around the end of the plug outside the casing, reacts between a washer $d$ on the end of the casing and the joint F, which connects the siphon D with the joint E', so as to preserve a tight fit between the parts.

In order to operate the parts thus far described from the outside of the apparatus, the valve I' is provided with a handle J, extending through the vertical slot $j$ in the tank-supporting wall B, and the siphon-pipe D has the handle G, which extends through the slot $b$, running parallel with $j$ and preferably on the opposite side of the vertical plane of the spout M. For the purpose of indicating to the operator the position of the siphon in the measuring vessel and enable him to adjust its open end at such height as to draw off the exact amount of liquid desired I provide an indicator-plate L on the outside of the supporting-flange B and arrange it vertically between the slots $b$ and $j$, so that the handle of the siphon will traverse one edge of the plate and the handle of the valve I' the other. I preferably curve the plate on an arc struck from the center point of the joint E', and I indicate the open and closed positions of the valve I' by the words "On" and "Off," arranged, respectively, at top and bottom of the plate. The opposite edge of the plate is provided with a number of notches $t$, each indicating a particular height of the end of the siphon in the vessel C, and opposite the several notches I mark on the plate the number of quarts, gallons, or pints (as may be desired) which will be drawn from the vessel by the siphon when the handle is adjusted to any particular notch, and in order to prevent accidental displacement of the handle G while drawing off liquid I provide its side next the plate with a lug or detent $x$, which takes into the notches and holds the handle until sprung sidewise and released.

In operation the handle J is lowered to the position indicated by the word "Off," when no liquid can pass out of the vessel C', which opens communication between C and the supply-pipe and permits the vessel to fill. When the vessel C is filled, the handle G is adjusted to such one of the notches $t$ as has opposite it the indicated quantity of liquid desired to be drawn off. The handle J is then raised to the position indicated by the word "On," which closes communication between the measuring vessel and the tank, opens the former to the spout M through the pipe H, valve-casing I, and discharge-pipe Q and permits the siphon to draw out of the vessel C the quantity denoted on the indicator-plate by the position of the handle G. When the flow has ceased, the handle J is lowered again to the position "Off," when the vessel C will again fill, ready for the next demand. The handle G may be left in whatever position it may chance to be until a different quantity of liquid is desired.

Having thus described the invention, what I claim is—

1. The combination of the air-tight tank R, the measuring vessel C, the equalizing-pipe P leading from the top of the measuring vessel to the top of the tank, the valve-casing I, the supply-pipe N leading from the tank to the valve-casing, the air-inlet $f$, the air-pipe O connecting said inlet with the top of the tank, the two-way valve I' in the casing I, the discharge-pipe Q, the pipe H leading from the valve-casing I to the measuring vessel, the joint E' and its casing E, and the pivoted siphon-pipe D connected with the joint.

2. The combination with the storage-tank, and the measuring vessel, of the pipes N and H for supplying liquid from the former to the latter, the discharge-pipe Q, the valve-casing with which said pipes connect, the air-pipe O extending from said casing to the top of the tank, a valve in the casing having an air-inlet relatively arranged to open the air-pipe to the tank only during the discharge from the measuring vessel, and a valveless air-equalizing pipe extending from the top of said vessel to the top of the tank.

3. The combination with the storage-tank, and the measuring vessel, of the pipes N and H for supplying liquid from the former to the latter, the discharge-pipe Q, the valve-casing with which said pipes connect, the air-pipe O extending from said casing to the top of the tank, a valveless air-equalizing pipe extending from the top of the measuring vessel also to the top of the tank, a valve in the casing controlling the supply of liquid to and its discharge from the measuring vessel, and also admitting air to the pipe O only during such discharge, and a siphon-pipe connected to the inner end of the pipe H by a movable joint.

4. The combination of the elevated air-tight tank R, the measuring vessel C located in the supporting-base B, the equalizing-pipe P extending from the top of the vessel C to the top of the tank, the pipes N and H for supplying liquid from the tank to the vessel C, the pipe Q for drawing off the contents of the vessel C, the valve-casing I with which the pipes N, H and G connect, the rotary two-way plug valve I' in said casing, the pipe O for supplying air to the top of the tank, said pipe also connecting with the valve-casing I, the liquid-passages $i$ and $i'$ and the air-inlet $f$ in the valve, the joint-casing E located in the measuring vessel, and having the rotary hollow plug E', and the siphon-pipe D connected with the valve, said joint E' and valve I' having handles projecting beyond and working in slots in the supporting-base of the tank.

In testimony thereof I affix my signature in presence of two witnesses.

ROY DOUGLAS BEMAN.

Witnesses:
ARTHUR V. LEBERMAN,
M. L. LYMAN.